(12) United States Patent
Goldstein et al.

(10) Patent No.: US 7,064,091 B2
(45) Date of Patent: Jun. 20, 2006

(54) INCORPORATION OF A SELF-CROSSLINKING POLYMER INTO A NONWOVEN BINDER FOR USE IN IMPROVING THE WET STRENGTH OF PRE-MOISTENED WIPES

(75) Inventors: Joel Erwin Goldstein, Allentown, PA (US); Ronald Joseph Pangrazi, Fleetwood, PA (US); Nicola Ranieri, Burghausen (DE); Christian Leonard Daniels, Macungie, PA (US)

(73) Assignee: Air Products Polymers, L.P., Allentown, PA (US)

( * ) Notice: Subject to any disclaimer, the term of this patent is extended or adjusted under 35 U.S.C. 154(b) by 179 days.

(21) Appl. No.: 10/353,676

(22) Filed: Jan. 29, 2003

(65) Prior Publication Data
US 2004/0147190 A1 Jul. 29, 2004

(51) Int. Cl.
*B32B 9/04* (2006.01)
*D04H 1/00* (2006.01)
*C08F 20/10* (2006.01)
*C08F 16/00* (2006.01)

(52) U.S. Cl. ............... 442/155; 442/327; 442/374; 525/330.3; 525/328.2

(58) Field of Classification Search ........... 442/374, 442/123, 155, 327
See application file for complete search history.

(56) References Cited

U.S. PATENT DOCUMENTS

| 4,393,173 A | 7/1983 | Daniels et al. |
| 4,454,286 A | 6/1984 | Daniels et al. |
| 4,647,611 A | 3/1987 | Goldstein et al. |
| 5,109,063 A | 4/1992 | Cheng et al. |
| 5,180,772 A | 1/1993 | Mao et al. .................. 524/816 |
| 5,540,987 A | 7/1996 | Mudge et al. .............. 428/288 |
| 2003/0232559 A1* | 12/2003 | Goldstein et al. ........... 442/374 |

FOREIGN PATENT DOCUMENTS

| EP | 0 474 924 A1 | 3/1992 |
| EP | 0 514 654 A1 | 11/1992 |
| EP | 0 612 718 A2 | 8/1994 |
| EP | 1 375 542 A1 | 1/2004 |
| WO | WO 92/08835 | 5/1992 |

* cited by examiner

*Primary Examiner*—Terrel Morris
*Assistant Examiner*—Lynda M. Salvatore
(74) *Attorney, Agent, or Firm*—Mary E. Bongiorno

(57) ABSTRACT

This invention is directed to an aqueous polymeric binder composition that is useful in improving the wet strength of pre-moistened wipes. The binder composition comprises a blend or mixture of two components. One component is a water dispersible polymer capable of binding together the fibers composing a nonwoven web. The other component is an aqueous solution or dispersion of a polymer comprised predominantly of self-crosslinking monomer(s).

11 Claims, No Drawings

INCORPORATION OF A SELF-CROSSLINKING POLYMER INTO A NONWOVEN BINDER FOR USE IN IMPROVING THE WET STRENGTH OF PRE-MOISTENED WIPES

FIELD OF THE INVENTION

This invention is directed to a nonwoven polymeric binder containing a self-crosslinking polymer and use of the binder to improve the wet strength of pre-moistened wipes.

BACKGROUND OF THE INVENTION

Pre-moistened cleansing wipes are well known and are referred to as wet wipes, towelettes, and the like. They include a substrate, such as a nonwoven web, pre-moistened with a lotion, such as an aqueous lotion. Typically, pre-moistened wipes are provided as either folded, stacked, sheets or as a perforated roll which are meant to be used one at a time. There are two basic types of containers for providing sheets of pre-moistened wipes—a reach-in container or tub and a pop-up container. In a reach-in container the trailing edge of a wipe being extracted from the container is interwoven with the leading edge of the next wipe. This facilitates the removal of subsequent sheets form the tub. However in a pop-up container, the sheets are still in roll form. The roll is standing on end and is perforated for tearing off sheets. When the roll is pulled through an aperture or opening in the container, a sheet can be torn off at the perforations leaving a nub of the subsequent sheet protruding through the aperture. In order to be useful in pop-up containers, the wet strength of the wet wipes must be such that the integrity of the wipe is maintained; i.e., the wipe does not rip or tear as it is being removed from the container.

Historically, the level of self-crosslinking monomer in the dispersion has been increased in order to improve the properties of the wipes. However, the level of wet tensile typically plateaus at a performance level below what is now required and increasing the level of self-crosslinking monomer does not enhance performance. Rather it simply increases the viscosity of the dispersion, making it too thick for the standard means of applying the binder onto the web; i.e., by spraying. Until recently, the amount of performance obtained from traditional binders has been adequate for the majority of the needs as tub wipes dominated the market. However, new wipes have been introduced that are pre-moistened with cleaning or polishing lotions and are used, for example, to polish furniture or automobiles. Many are used to clean hard surfaces. The lotions are harsher on the skin and the web; therefore in order to protect the consumer, the wipes have been dispensed from canisters rather than from tubs. The canisters have a small aperture at the top through which the pre-moistened wipe must be drawn. Therefore, the webs must have a higher wet tensile than in the past to withstand the additional strain and must also be stable to the harsher lotions. The new wipes that are being introduced today for these applications use spunbond or melt-blown fabric instead of airlaid web. The spunbond or melt-blown webs are more expensive, non-biodegradable and less absorbent than airlaid webs. These drawbacks are the driving force for developing airlaid webs with the required strength.

Due in part to regulations in Europe, regarding use of alkylphenol ethoxylate (APE)-based products, there is also a need to use APE-free polymer emulsion binders in preparation of nonwoven webs for use in wet wipes.

Examples of known polymer emulsions binders for use in nonwovens are described below:

U.S. Pat. No. 5,180,772 (Mao et al., 1993) discloses vinyl acetate/ethylene copolymer emulsions having extended shelf and useful as binders for nonwovens. Nonwoven products formed by depositing the emulsion onto a nonwoven substrate exhibit improved resistance to organic solvents.

U.S. Pat. No. 5,540,987 (Mudge et al., 1996) discloses a low formaldehyde emulsion binder that is useful in improving the tensile properties of nonwovens.

BRIEF SUMMARY OF THE INVENTION

This invention is directed to an aqueous polymeric binder composition that is useful in improving the wet strength of pre-moistened wipes. The binder composition comprises a blend or mixture of two components. One component is a water dispersible polymer capable of binding together the fibers composing a nonwoven web. The other component is an aqueous solution or dispersion of a polymer comprised predominantly of self-crosslinking monomer(s). By predominantly self-crosslinking monomer(s) is meant 50 to 100 wt % self-crosslinking monomer(s), based on the total weight of the polymer. The binder composition of this invention can be free of APEs.

One embodiment of the invention is a polymeric binder composition comprising 90 to 99 wt % (preferably 95 to 97 wt %) of water dispersible polymer and 1 to 10 wt % (preferably 3 to 5 wt %) of polymer comprised of predominantly self-crosslinking monomer(s), based on the total weight of solids.

Another embodiment is a polymeric binder composition comprising a water dispersible polymer and a polymer comprised of predominantly self-crosslinking monomer(s), wherein the water dispersible polymer comprises vinyl acetate, one or more other ethylenically unsaturated monomer, a crosslinking monomer, and a functional monomer.

Yet another embodiment is a pre-moistened wipe comprising a web of airlaid nonwoven fibers bonded with a polymeric binder composition comprising a water dispersible polymer and a polymer comprised of predominantly self-crosslinking monomer(s), The present invention provides a pre-moistened wipe having the following advantages:

has sufficient wet tensile strength to enable its use in a pop-up canister; and
can be free of alkylphenol ethoxylates.

DETAILED DESCRIPTION OF THE INVENTION

There are two approaches to forming the binder composition of this invention. The first approach, a blend approach, entails the simple blending of a water dispersible polymeric binder with an aqueous solution or dispersion of a polymer comprising a self-crosslinking monomer. The second approach, a staged polymerization approach, comprises the in situ formation of the polymer comprising self-crosslinking monomer(s) in the same reactor train, after the formation of the water dispersible polymeric binder.

The water dispersible polymeric binder is typically a polymer emulsion. Ethylenically unsaturated monomers that can be used in the preparation of the polymer binder of this invention include, but are not limited to, vinyl esters, such as vinyl acetate; ethylene; styrene; butadiene; $C_{1-8}$ alkyl esters of acrylic and methacrylic acid, such as methyl (meth)acrylate, ethyl (meth)acrylate, butyl (meth)acrylate, hexyl (meth)acrylate, and 2-ethylhexyl (meth)acrylate; diacrylates; unsaturated carboxylic acid, such as acrylic, methacrylic, crotonic, itaconic, and maleic acid; acrylonitrile; and vinyl esters of $C_{2-10}$ alcohols.

The water dispersible polymer typically comprises 50 to 95 wt % (preferably 65 to 85 wt %) of a vinyl ester, such as vinyl acetate, 5 to 30 wt % (preferably 7 to 20 wt %) of one or more other ethylenically unsaturated monomer, 0 to 8 wt % (preferably 1–5 wt %) of a crosslinking monomer, and 0 to 12 wt % (preferably 2 to 10 wt %) of a functional monomer, based on the total weight of monomers. Examples of crosslinking monomers are N—($C_{1-4}$) alkylol (meth) acrylamide, such as N-methylol acrylamide (NMA), i-butoxy methylacrylamide, acrylamidoglycolic acid, acrylamidobutyraldehyde, and the dialkyl acetal of acrylamidobutyraldehyde, in which the alkyl can have 1 to 4 carbons. Any of the crosslinking monomers can be used alone, together, or in combination with acrylamide.

Examples of water dispersible polymeric binders are aqueous emulsions of vinyl acetate/ethylene/NMA polymers; vinyl acetate/ethylene/NMA/acrylamide polymers; vinyl acetate/butyl acrylate/NMA polymers; vinyl acetate/butyl acrylate/NMA/acrylamide polymers; vinyl acetate/vinyl versatate/NMA polymers; vinyl acetate/vinyl versatate/NMA/acrylamide polymers; vinyl acetate/ethylene/vinyl versatate/NMA copolymers; vinyl acetate/ethylene/vinyl versatate/NMA/acrylamide polymers; and the like. Vinyl versatate is the vinyl ester of versatic acids ($C_9$ to $C_{19}$ trialkyl acetic acids). Veova 10 is an example of a commercially available vinyl versatate. AIRFLEX 192 VAE polymer emulsion, available from Air Products Polymers, L.P., is an example of an appropriate commercial binder for this invention.

Examples of functional monomers include, but are not limited to, acetoacetoxyethyl methacrylate (AAEM), hydroxyethyl (meth)acrylate, hydroxypropyl (meth)acrylate, and hydroxybutyl(meth)acrylate.

The emulsion polymerization may be conducted in a stage or sequential manner and can be initiated by thermal initiators or by a redox system. A thermal initiator is typically used at temperatures at or above about 70° C. and redox systems typically are preferred at temperatures below about 70° C. The amount of thermal initiator used in the process is 0.1 to 3 wt %, preferably more than about 0.5 wt %, based on total monomers. Thermal initiators are well known in the emulsion polymer art and include, for example, ammonium persulfate, sodium persulfate, and the like. The amount of oxidizing and reducing agent in the redox system is about 0.1 to 3 wt %. Any suitable redox system known in the art can be used; for example, the reducing agent can be a bisulfite, a sulfoxylate, ascorbic acid, erythorbic acid, and the like. Examples of oxidizing agent are hydrogen peroxide, organic peroxides, such as t-butyl peroxide or t-butyl hydroperoxide (t-BHP), persulfates, and the like.

Effective emulsion polymerization reaction temperatures range from about 30 and 100° C.; preferably, 55 to 90° C., depending on whether the initiator is a thermal or redox system.

Crosslinking monomers that can be incorporated into the polymers comprised of predominantly crosslinking monomers include, but are not limited to, NMA; acrylamide; isobutyl methacrylamide; n-butyl methacrylamide; acrylamidoglycolic acid; and acryamidobutyraldehyde dialkyl acetal. Following are representative examples of polymers comprised of self-crosslinking monomer(s): a homopolymer of NMA, a copolymer of NMA and acrylamide, a polymer of NMA, acrylamide, and one or more of the following monomers: vinyl acetate, butyl acrylate, methyl methacrylate, or vinyl versatate. Commercially available NMA-LF (low formaldehyde NMA) is known in the United States as MAMD (available from Cytec) or NMA2820 (available from Flocryl). MAMD is a 1:1 molar ratio of NMA: acrylamide. The crosslinking monomers comprises 50 to 100 wt % of the polymer, based on the total weight of monomers.

The polymers comprised of predominantly self-crosslinking monomers can also include other functional monomers such as acrylic acid, maleic acid, glycidyl methacrylate, and diacetoneacrylamide. These polymers can also contain other ingredients; for example, charge transfer agents, such as 1-butanal, 3-mercaptopropionic acid, and sodium bisulfite, and a cosolvent, such as isopropyl alcohol.

The polymers comprised of predominantly self-crosslinking monomers can have a molecular weight between 2000 daltons and 1,500,000 dalton; preferably 10,000 to 200,000 daltons. Polymers with a molecular weight above 750,000 dalton may quickly gel after addition to the water dispersible. Similarly, those polymers with a molecular weight between 500,000 dalton and 750,000 dalton may separate after being combined with the water dispersible.

Examples of methods which have be used to prepare the polymer comprised predominantly of self-crosslinking monomer(s) are described below:

Example of Thermal Initiation: A two-liter atmospheric kettle reactor equipped with a mechanical stirrer, nitrogen inlet and sensors for measuring reaction temperature was deoxygenated by vacuum and purging with nitrogen. To this reactor was charged 750 ml of water, potassium persulfate (5 g, 18.5 mmol) and 10 g of sodium bicarbonate as buffer under a nitrogen blanket. After heating to 75° C., a 3% potassium persulfate solution (165 g, 18.3 mmol) and a 44.8% aqueous NMA solution (700 g, 3.68 mol) were delay fed to the reactor, with delay times of 3.5 hours and 2.5 hours, respectively. During the delays, the reaction mixture was stirred and the pH held in the range 7–8 by addition of sodium bicarbonate. After the persulfate delay was finished, the reaction mixture was cooled down to room temperature. The solution has a 20% solid content and a yield of almost 100% (residual monomer=160 ppm). Size exclusion chromatography (SEC) analysis showed a weight average molecular weight (Mw) of 240,700, a number average molecular weight (Mn) of 58,600 and a polydispersity (PD) of 4.11.

Example of Redox Initiation: A two-liter atmospheric kettle reactor equipped with a mechanical stirrer, nitrogen inlet and sensors for measuring reaction temperature was deoxygenated by vacuum and purging with nitrogen. To this reactor was charged 480 ml of water, iron (II) ammonium sulfate hexahydrate (10 mg, 0.03 mmol) and EDTA tetrasodium salt (10 mg, 0.03 mmol) under a nitrogen blanket. After heating to 75° C., a 3% t-BHP solution (112 g, 37 mmol), a 3% ascorbic acid solution (110 g, 19 mmol) and a 35% aqueous NMA solution (910 g, 3.74 mol) were delay fed into the reactor. Delay time was 3.5 h for the peroxide and ascorbic acid solutions, and 3 hours for the NMA solution. During the delays, the reaction mixture was kept stirring and the pH was held in the range 6–7 by addition of ammonia. After the initiator delays were finished, the reaction mixture was cooled to room temperature. The solution had a 20% solid content and a yield of almost 100% (residual monomer=60 ppm). SEC analysis showed Mw of 95200, Mn of 34900 and PD of 2.73.

The following conditions are relevant to forming the polymer comprised predominantly of self-crosslinking monomer(s):

The reaction temperature can be varied but should not exceed 75° C.

The initiator can be: t-BHP, potassium, sodium or ammonium persulfate. It's concentration can range between 0.5–4% (w/w) in the premix (for thermal process only) and between 3–10% (w/w) in the delay.

The addition time for the monomer is preferably at least 2.5 hours. The initiator delay is preferably run at least 1 hour longer (thermal process) or 30 minutes longer (redox process) than the monomer delay.

NMA can be pure NMA or a mixture NMA:acrylamide in different ratios.

The same procedures are also followed if other comonomers are present in the monomer delay, such as, e.g., acrylic acid, maleic acid, 2-hydroxyethyl acrylate, 2-hydroxypropyl acrylate, or in a separate delay, such as, e.g., vinyl acetate or glycidyl methacrylate.

The molecular weight of the polymer is controlled by varying the molar ratio of initiator to monomer.

The two polymeric components are then blended together, formulated with a wetting agent (Aerosol OT-75) and catalyst (ammonium chloride), and then applied to the web after the airlaid process.

In the second approach, the staged polymerization approach, the polymer comprised predominantly of self-crosslinking monomer can be polymerized in the same reactor train, after the water dispersible polymer is formed. In general, an example of the second approach is as follows: The water dispersible polymer, such a vinyl acetate/ethylene polymer emulsion, is first made in a reactor. When the free monomer has fallen to the standard level of less than 1.5% of the batch, additional self-crosslinking monomer is added to the batch and the reactor cooled. When the batch has cooled to an acceptable level, the batch is transferred to a second vessel and the residual ethylene stripped off. The same redox couple which was used during the preparation of the water dispersible polymer is then pumped into the vessel at the same rates for 30 minutes. The batch is stirred for an additional 30 minutes and then the reaction is cooled and treated with defoamer. The optimal temperature for this second stage polymerization is less than 50° C.

A typical procedure for making the water dispersible polymer is as follows: The polymerization of various vinyl acetate/ethylene/N-methylolacrylamide (VAE/NMA) combinations is carried out in a one gallon stirred, stainless steel reaction vessel equipped with a jacket. The reaction vessel is charged initially with 900.0 g of deionized water, 75.0 g of Aerosol A-102, 15.0 g of Rhodapex DS-10, 15.0 g of 25% aqueous sodium vinyl sulfonate, 1.0 g of sodium citrate, 3.5 g of 50% aqueous citric acid, 2.3 g of 5% aqueous ferric ammonium sulfate and 1658.0 g of vinyl acetate. While stirring, 320.0 g of ethylene is introduced below the surface of the liquid in the reaction vessel. The reaction vessel is heated to 32° C. Upon equilibration, the following three aqueous solutions are intermittently added to the reaction vessel over the course of the reaction (on a delay basis); 5% sodium erythorbate, 2.0% t-BHP, and 340.0 g of a 30% aqueous solution of NMA. The temperature of the reactor was increased linearly to 55° C. over 60 minutes. After four hours the MAMD delay is complete and the other two delays continued for another 30 minutes. After preparation of the water dispersible polymer, it can be blended with the polymer that contains predominantly self-crosslinking monomer(s) or the polymer that contains predominantly self-crosslinking monomer(s) can be prepared in the same reactor train as the water dispersible polymer.

If the blend approach is taken, the reaction is terminated by cooling and the batch is transferred to a stripping vessel. When the ethylene has been stripped off, 10.0 g of a solution of 15% sodium formaldehyde sulfoxylate and 40.0 g of a 3.0% t-BHP solution are added over 30 minutes. After the addition of the redox delays are complete, the batch is stirred for an additional 30 minutes, whereupon it is cooled and treated with 1.0 g of Foamaster VF. The polymer comprised predominantly of self-crosslinking monomer is then blended with the water dispersible polymer in a ratio of 1% to 10%, based on total solids.

If the second staged polymerization approach is chosen, 170.0 g of a 30% MAMD solution is added to the batch over 10 minutes. The batch is transferred to the stripping vessel. When the ethylene has been stripped off, 10.0 g of a solution of 5% sodium erythorbate and 40.0 g of a 2.0% t-BHP solution are added over 30 minutes. This step can be done at as low a temperature as economically feasible. This should be between 55° C. and 20° C. After the addition of the redox delays are complete, the batch is stirred for an additional 30 minutes, whereupon it is cooled and treated with 1.0 g of Foamaster VF.

Regardless of the method of making the blend of water dispersible polymer and polymer comprised predominantly of self-crosslinking monomer, the total amount of crosslinking monomer in the blend is 1 to 11 wt %, preferably 5 to 9 wt %, based on total solids.

In general, the wet wipe comprises primarily cellulose wood pulp fibers, typically with an added amount of textile fibers to enhance wet and dry strength. Wood pulp fibers can also be blended with synthetic fibers. Preferred textile fibers include rayon, cotton, wool, acetate, or tencel fibers. Examples of synthetic fibers are polyesters such as polyethylene terephthalate, polyolefins such as polypropylene, polyamides such as nylon, and fiberglass. Typically, the nonwoven substrate comprises about 75 to 90 wt % wood pulp fibers and about 5 to 25 wt % of textile or synthetic fibers.

Wood pulp (alone or blended with natural or synthetic fibers) can be processed by dry (air-laid, carded, rando) or wet-laid processes. Nonwoven webs produced by air-laid processes are preferred due to minimal hydrogen bonding of fibers in the finished product compared to wet-laid nonwovens.

The amount of binder composition of this invention, calculated on a dry basis, applied to the fiber starting web is at least sufficient to bind the fibers together to form a self-sustaining web and can range from about 3 to about 100 wt % of the starting web; typically 10–30 wt %. The binder composition is typically applied to the web by spraying it on by techniques well known in the art. However other methods of application known in the art can also be used.

Typical conditions for achieving optimal crosslinking using the binder composition of this invention is to dry the impregnated web of fibers at 150 to 200° F. (66 to 93° C.) for 4 to 6 minutes followed by curing at 300 to 310° F. (149 to 154° C.) for 3 to 5 minutes or more. However, other time-temperature relationships can be used as is well known in the art.

The invention will be further clarified by a consideration of the following examples, which are intended to be purely exemplary of the use of the invention.

EXAMPLE 1

Preparation of AAEM Modified VAE/MAMD Polymer

To a one-gallon steel reactor was charged 745.0 g of deionized water, 69.4 g of a 30% aqueous solution of disodium laureth sulfosuccinate (Aerosol A-102), 13.9 g of sodium dodecylbenzene sulfonate (Rhodapex DS-10), 13.9 g of a 30% aqueous solution of sodium vinyl sulfonate, 2.1 g of a 5% aqueous solution of ferrous ammonium sulfate, 8.1 g of a 50% aqueous solution of citric acid, 0.7 g of sodium citrate and 1442.0 g of vinyl acetate. The reactor was heated to 32° C., 295 g of ethylene was added as was 7.3 g of a 5% aqueous solution of sodium erythorbate. A 2.6% aqueous solution of t-BHP was added at 0.5 ml/min and a 5% aqueous solution of sodium erythorbate was added at 0.7 ml/min. When initiation occurred, 245.95 g of a 31.74% aqueous solution of MAMD was added at a rate of 1.7 ml/min for 5 minutes. The temperature was then ramped up to 80° C. over 78 minutes and the MAMD delay was added at a rate of 3.7 ml/min for 50 minutes. Then the rate was slowed on the MAMD delay to 1.4 ml/min until empty. At the 45 minute mark of the reaction, 204 g of a 50:50 delay of AAEM:vinyl acetate was added at a rate of 3.4 ml/min for 60 minutes. When the monomer delays were complete, the batch was cooled, resulting in a latex with 54.3% solids, a viscosity of 460 cps and a $T_g$ of 7.9° C. Vinyl acetate=75.47%, Ethylene=14.61%, AAEM=5.05%, and MAMD=3.87%.

COMPARATIVE EXAMPLE 1

Preparation of VAE/MAMD/NMA Polymer

To a one-gallon steel reactor was charged 820.0 g of deionized water, 75.0 g of a 30% aqueous solution of disodium laureth sulfosuccinate (Aerosol A-102), 15.0 g of sodium dodecylbenzene sulfonate (Rhodapex DS-10), 15.0 g of a 30% aqueous solution of sodium vinyl sulfonate, 2.3 g of a 5% aqueous solution of ferrous ammonium sulfate, 6.67 g of a 50% aqueous solution of citric acid, 1.0 g of sodium citrate, 100.0 g of a 20% aqueous solution of poly(NMA) (10,000 dalton) and 1658.0 g of vinyl acetate. The reactor was heated to 32° C., 320 g of ethylene was added as was 7.3 g of a 5% aqueous solution of sodium erythorbate. A 2.6% aqueous solution of t-BHP was added at 0.5 ml/min and a 5% aqueous solution of sodium erythorbate was added at 0.7 ml/min. When initiation occurred, 340.0 g of a 30.0% aqueous solution of MAMD was added at a rate of 1.4 ml/min for 240 minutes. The temperature was then ramped up to 55° C. over 60 minutes. When the monomer delay was complete, the two redox couple delays were continued for another 30 minutes. The batch was then cooled, resulting in a latex with 54.3% solids, a viscosity of 110 cps and a $T_g$ of 9.6° C. Vinyl acetate=78.95%, Ethylene=15.23%, MAMD=4.86%, and NMA=1%.

COMPARATIVE EXAMPLE 2

Preparation of VAE/MAMD Emulsion Polymer

To a one-gallon steel reactor was charged 837.6 g of deionized water, 78.1 g of a 90% aqueous solution of tridecyl alcohol ethoxylate (18 moles EO) (Polystep TD-189), 2.2 g of a 5% aqueous solution of ferrous ammonium sulfate, 0.6 g of a 50% aqueous solution of citric acid, 0.8 g of sodium citrate and 1492.0 g of vinyl acetate. The reactor was heated to 32° C., 295 g of ethylene is added as is 7.5 g of a 5% aqueous solution of disodium glyoxylate sulfoxylate (Bruggelite FF-6). A 2.6% aqueous solution of t-BHP was added at 0.5 ml/min and a 5% aqueous solution of sodium erythorbate was added at 0.7 ml/min. When initiation occurred, 243.4 g of a 49.78% aqueous solution of MAMD was added at a rate of 1.7 ml/min for 3.9 minutes. The temperature was then ramped up to 80° C. over 20 minutes and the MAMD delay is added at a rate of 3.9 ml/min for 50 minutes. Then the rate was slowed on the MAMD delay to 1.4 ml/min until empty. When the monomer delay was complete, the batch was checked for residual vinyl acetate. If this level was below 1.5%, the batch was then cooled resulting in a latex with 52.1% solids, a viscosity of 110 cps and a $T_g$ of 2.3° C. Vinyl acetate=78.19%, Ethylene=15.46%, and MAMD=6.35%.

COMPARATIVE EXAMPLE 3

Preparation of VAE/NMA/AA Polymer Emulsion

To a one-gallon steel reactor was charged 1000.0 g of deionized water, 3.0 g of disodium phosphate, 4.0 g of a 1% aqueous solution of ferrous ammonium sulfate, and 2.0 g of a 70% aqueous solution of t-BHP. The reactor was heated to 70° C., 45 g of vinyl acetate/acrylic acid/t-BHP (70%) [1958.0 g/22.2 g/15.4 g] delay and 15.0 g of a 48% aqueous solution of NMA are added over five minutes. A reducing agent delay (402.6 g of deionized water, 40.2 g of sodium metabisulfate and 30.2 g of disodium phosphate) was prepared and added at a rate of 0.3 g/min. When initiation occurred, the rest of the vinyl acetate/acrylic acid/t-BHP delay was added at constant rate over three hours. Simultaneously 445.0 g of 48% NMA was added at a constant rate over three hours. Simultaneously, 320 g of ethylene was charged to the reactor over 15 minutes. The reducing agent delay was adjusted to maintain a free monomer of between 4.5–5.5% for the first 60 minutes of the delays. After this time period, the rate was adjusted to maintain a free monomer level of between 1 and 3%. If, at the three hour mark, the free monomer was below 1.5%, the reaction was cooled and transferred to the degasser while adding 1.5 g of defoamer. The reaction results in a dispersion with solids of 52.5%, a viscosity of 360 cps and a $T_g$ of 5.6° C. Vinyl acetate=77.9%, Ethylene=12.7%; NMA=8.5%, and acrylic acid=0.8%.

The following examples show the effect on dry and wet tensile strength when using a combination poly(NMA) or poly(MAMD) with a VAE polymeric binder or an AAEM-modified VAE polymeric binder.

The following procedure was used to determine tensile strength. The binder composition was diluted to 10% solids and uniformly sprayed onto an airlaid web of a 85:15 blend of cellulose and low melt bicomponent fibers (75 g/m² density). The targeted add-on weight of binder was 20 wt %±2 wt %. The sprayed web was dried and cured in a Mathis LTE through air oven at 320° F. (160° C.) for 3 minutes.

Test methods similar to industry standards, such as ASTM-D1117 (Mechanical Tensile Testing of Strength of Paper and Paperboard), TAPPI T-494 (dry tensile), and TAPPI T-456 (Wet Tensile Strength Determination Using Finch Cup Apparatus), were used to measure tensile strength.

The specific procedure for measuring wet tensile strength was as follows: The finished (bonded) dried and cured airlaid web was cut into 5 cm wide strips, and the strips were looped around a finch cup apparatus that was then filled with the wet tensile fluid (either deionized water or DI water with a small amount of wetting agent added, such as 0.5% (solids on solids) Aerosol OT, a commercially available dioctyl sodium sulfosuccinate surfactant). TAPPI T-456 procedure was then followed.

An Instron Model 1122 mechanical tensile tester was used to measure dry and wet tensile strength. Tensile strength is reported in grams/5 cm.

EXAMPLE 2

Post Addition of Poly(NMA) and Poly(MAMD) to Polymer of Example 1

Poly(NMA) and poly(MAMD) having a weight average molecular weight of 10,000 were blended with polymer of Example 1 at various levels, before applying the blend to the airlaid web. Tables 1 and 2 show the results of tests of dry and wet tensile strength of the bonded webs.

TABLE 1

| % poly (NMA) | Dry Tensile Strength | Wet Tensile Strength |
|---|---|---|
| 0 | 3175 | 1844 |
| 2.5 | 3690 | 2126 |
| 5 | 3119 | 2212 |
| 7.5 | 3191 | 2271 |
| 10 | 3095 | 2287 |

TABLE 2

| % poly (MAMD) | Dry Tensile Strength | Wet Tensile Strength |
|---|---|---|
| 0 | 3175 | 1844 |
| 2.5 | 3119 | 2036 |
| 5 | 3060 | 1973 |
| 7.5 | 3140 | 2118 |
| 10 | 3148 | 2113 |

The data in Tables 1 and 2 show that dry tensile strength is maintained and wet tensile strength is significantly improved by using, as a binder, a blend of poly(NMA) or poly(MAMD) with AAEM-modified VAE binder. An improvement is shown with as little as 2.5% of poly(NMA) or poly(MAMD).

EXAMPLE 3

Post Addition of Poly(MAMD) to Airflex 192 VAE Binder

Poly(MAMD) was blended with AIRFLEX 192 VAE binder at various levels, before applying the blend to the airlaid web. The poly(MAMD was prepared at two different temperatures, 30° C. and 55° C. Tables 3 and 4 show the results of tests of dry and wet tensile strength of the bonded webs.

TABLE 3

| % poly (MAMD) prepared at 30° C. | Dry Tensile Strength | Wet Tensile Strength |
|---|---|---|
| 0 | 2963 | 1723 |
| 1 | 3121 | 1756 |
| 2.5 | 3148 | 1813 |
| 4 | 3201 | 1844 |

TABLE 4

| % poly (MAMD) prepared at 55° C. | Dry Tensile Strength | Wet Tensile Strength |
|---|---|---|
| 0 | 2963 | 1723 |
| 1 | 3164 | 1671 |
| 2.5 | 3201 | 1705 |
| 4 | 3189 | 1709 |

The data in Table 3 show that dry tensile strength and wet tensile strength are improved with addition of poly(MAMD) that is produced at 30° C. The data in Table 4 show that dry tensile strength is improved with the addition of poly (MAMD) produced at 55° C. and wet tensile strength is maintained. Poly(MAMD) prepared at 30° C. will have a higher molecular weight compared to poly(MAMD) prepared at 55° C.

EXAMPLE 4

Post Addition of Various Molecular Weight Poly(NMA) and Poly(MAMD) to AAEM-Modified Airflex 192 VAE Poly(NMA) and poly(MAMD), having a variety of weight average molecular weights, was blended with unmodified AIRFLEX 192 VAE and AAEM-modified AIRFLEX 192 VAE, before applying the blend to the airlaid web. Tables 5 and 6 show the results of tests of dry and wet tensile strength of the bonded webs. AIRFLEX 192 VAE polymeric binder has the following properties: solids=52%, pH=5.5, $T_g$=10° C., viscosity=250–425 cps.

TABLE 5

| Addition* of Poly (NMA) and Poly (MAMD) | Dry Tensile Strength | Wet Tensile Strength |
|---|---|---|
| 0** | 3002 | 1718 |
| 0 | 2848 | 1727 |
| 10K Poly (NMA) | 3074 | 2100 |
| 2.7K Poly (NMA) | 2878 | 1957 |
| 10K Poly (MAMD) | 2926 | 1968 |
| 15K Poly (MAMD) | 2934 | 1969 |

*5% solid on solid addition to AIRFLEX 192 VAE polymer modified with 5% AAEM
**Unmodified AIRFLEX 192 VAE

TABLE 6

| Poly (NMA) and Poly (MAMD) Addition* to unmodified AIRFLEX 192 VAE polymer | Dry Tensile Strength | Wet Tensile Strength |
|---|---|---|
| 0 | 2550 | 1650 |
| 79K Poly (NMA) | 2579 | 1712 |
| 112K Poly (NMA) | 2577 | 1733 |
| 149K Poly (NMA) | 2649 | 1959 |
| 374K Poly (NMA) | 2622 | 1822 |
| 31K Poly (NMA-LF) | 2619 | 1822 |

TABLE 6-continued

| Poly (NMA) and Poly (MAMD) Addition* to unmodified AIRFLEX 192 VAE polymer | Dry Tensile Strength | Wet Tensile Strength |
|---|---|---|
| 57K Poly (NMA-LF) | 2514 | 1765 |
| 96K Poly (NMA-LF) | 2052 | 1469 |
| 515K Poly (NMA-LF) | 2724 | 1967 |

*2.5% solid on solid

The data in Table 5 show that when AIRFLEX 192 VAE and AAEM-modified AIRFLEX 192 VAE polymer alone was used as the binder, wet tensile strength was about the same. Dry tensile strength is maintained and wet tensile strength is improved with addition of poly(NMA) or poly(MAMD) having a variety of molecular weights. The data in Table 6 show the most improvement in dry tensile strength is achieved with the addition of 515K poly(NMA-LF) and the most improvement in wet tensile strength is achieved with 149K poly(NMA) and 515K poly(NMA-LF).

EXAMPLE 5

Comparison of Airflex 192 VAE Binder of Polymers of Comparative Example 2 and Comparative Example 3

The following tables show the performance of various polymers made according to comparative example 2 or comparative example 3, compared to AIRFLEX 192 VAE binder.

TABLE 7

| Binder | Dry Tensile Strength | Wet Tensile Strength |
|---|---|---|
| AIRFLEX 192 VAE | 3141 | 1790 |
| Comp. Ex. 2, Tg = 15 | 3228 | 1900 |
| Comp. Ex. 2, Tg = 1 | 2822 | 1839 |

TABLE 8

| Binder | Dry Tensile Strength | Wet Tensile Strength |
|---|---|---|
| AIRFLEX 192 VAE | 3260 | 1788 |
| Comp. Ex. 3 | 3263 | 1759 |
| Comp. Ex. 3 + 25% Veova 10 | 2949 | 1703 |
| Comp. Ex. 3 + 25% ethyl acrylate | 2776 | 1349 |
| Comp. Ex. 3 + 25% butyl acrylate | 2686 | 1355 |

TABLE 9

| Binder | Dry Tensile Strength | Wet Tensile Strength |
|---|---|---|
| AIRFLEX 192 VAE | 3184 | 1786 |
| Comp. Ex. 3 | 1989 | 923 |
| Comp. Ex. 3 + ethylene* | 2682 | 1242 |

*Enough ethylene to produce a polymer having a Tg of 5° C.

TABLE 10

| Binder | Dry Tensile Strength | Wet Tensile Strength |
|---|---|---|
| Comp. ex. 2 polymer alone | 3002 | 1718 |
| Blend of polystyrene acrylic copolymer with comp. ex. 2 polymer | 3298 | 1263 |

Data in Table 7 show that dry and wet tensile strength is improved when polymer of comparative example 2, having a Tg of 15° C., is used as binder compared to the AIRFLEX 192 VAE control.

Data in Table 8 show that there is no improvement in dry or wet tensile strength using a polymer of comparative example 3, compared to AIRFLEX 192 VAE, and addition of another comonomer to the polymer of comparative example 3 does not improve tensile strength when used as a nonwoven binder.

Data in Table 9 show that modification of a polymer of comparative example 3 with ethylene does not improve the dry or wet strength of nonwoven webs bonded with the polymers.

Data in Table 10 show that combining a polystyrene acrylic polymer with a polymer of comparative example 2 does not improve the dry or wet strength of nonwoven webs bonded with the polymer blend.

EXAMPLE 6

Various levels of poly(NMA) having a weight average molecular weight of 10,000 was blended with unmodified AIRFLEX 192 VAE binder and 5% AAEM modified AIRFLEX 192 VAE binder, before applying the blend to the airlaid web. Tables 11 and 12 show the results of tests of dry and wet tensile strength of the bonded webs.

TABLE 11

| Addition to 5% AAEM modified AIRFLEX 192 VAE | Dry Tensile Strength | Wet Tensile Strength |
|---|---|---|
| 0 | 2691 | 1804 |
| 2.5% Poly(NMA) | 2778 | 1953 |
| 5% Poly(NMA) | 2949 | 2083 |
| 7.5% Poly(NMA) | 2842 | 2140 |

TABLE 12

| Addition to AIRFLEX 192 VAE | Dry Tensile Strength | Wet Tensile Strength |
|---|---|---|
| 0 | 3018 | 1737 |
| 1% Poly(NMA) | 3153 | 1743 |
| 2.5% Poly(NMA) | 3085 | 1804 |
| 4% Poly(NMA) | 3104 | 1869 |

The data in Tables 11 and 12 show that there is a bigger improvement in dry and wet tensile strength when poly(NMA) was combined with modified AIRFLEX 192 VAE binder compared to unmodified AIRFLEX 192 VAE binder.

The invention claimed is:

1. A packaged pre-moistened wet wipe comprising,
  1) a web of nonwoven fibers bonded with a binder;
  2) the binder comprises a blend of:

a) a water dispersible polymeric binder; and
b) an aqueous solution or an aqueous dispersion of a polymer comprising predominantly self-crosslinking monomer;
3) the total amount of crosslinking monomer in the blend is 1 to 11 wt. %, based on the total weight of solids.

2. The packaged pre-moistened wet wipe of claim 1 wherein the blend comprises 90 to 99 wt % of the water dispersible polymeric binder and 1 to 10 wt % of the polymer comprising predominantly seif-crosslinking monomer, based on the total weight of solids.

3. The packaged pre-moistened wet wipe of claim 1 wherein the blend comprises 95 to 97 wt % of the water dispersible polymeric binder and 3 to 5 wt % of the polymer comprising predominantly self -crosslinking monomer, based on the total weight of solids.

4. The packaged pre-moistened wet wipe of claim 1 wherein the water dispersible polymeric binder is a polymer emulsion, said polymer emulsion comprises a polymer containing 50 to 95 wt % of a vinyl ester 5 to 30 wt % of another ethylenically unsaturated monomer, 0 to 8 wt % of a self-crosslinking monomer, and 0 to 10 wt % of a functional monomer.

5. The packaged pre-moistened wet wipe of claim 4 wherein said polymer emulsion comprises a polymer containing 65 to 85 wt % of a vinyl ester 7 to 20 wt % of another ethylenically unsaturated monomer, 1 to 5 wt % of a self-crosslinking monomer, and 2 to 10 wt % of a functional monomer.

6. The packaged pre-moistened wet wipe of claim 5 wherein the vinyl ester is vinyl acetate, the other ethylenically unsaturated monomer is selected from the group consisting of ethylene, butyl acrylate, vinyl versatate, or mixtures thereof, the self-crosslinking monomer is selected from the group consisting of N-methylol acrylamide, acrylamide, i-butoxy methylacrylamide, acrylamidoglycolic acid, acrylamidobutyraldehyde, a dialkyl acetal of acrylamidobutyraldehyde, and mixtures thereof, the functional monomer is selected from the group consisting of acetoacetoxyethyl methacrylate (AAEM), hydroxyethyl acrylate, hydroxyethyl methacrylate, hydroxypropyl acrylate, hydroxypropyl methacrylate, hydroxybutyl methacrylate, hydroxybutyl acrylate, and mixtures thereof.

7. The packaged pre-moistened wet wipe of claim 6 wherein the polymer comprising predominantly self-crosslinking monomer comprises 50 to 100 wt % monomers, based on total solids, selected from the group consisting of N-methylol acrylamide, acrylamide, isobutyl methacrylamide, n-butyl methacrylamide; acrylamidoglycolic acid, acryamidobutyraldehyde dialkyl acetal, and mixtures thereof, wherein each alkyl contains 1 to 4 carbons.

8. The packaged pre-moistened wet wipe of claim 7 wherein the polymer comprising predominantly self-crosslinking monomer further comprises monomers selected from the group consisting of vinyl acetate, butyl acrylate, methyl methacrylate, and vinyl versatate.

9. The packaged pre-moistened wet wipe of claim 1 wherein the polymeric binder and the polymer comprising predominantly self-crosslinking monomer are in an aqueous emulsion.

10. The packaged pre-moistened wet wipe of claim 1 wherein the binder is free of alkylphenol ethoxylates.

11. A packaged pre-moistened wet wipe comprising,
1) a web of nonwoven fibers bonded with a binder;
2) the binder comprises a blend of:
a) a water dispersible polymeric binder; and
b) an aqueous solution or an aqueous dispersion of a polymer comprising predominantly seif-crosslinking monomer;
3) the total amount of crosslinking monomer in the blend is 1 to 11 wt. %, based on the total weight of solids; and the water dispersible polymeric binder is a polymer emulsion comprising a polymer containing 65 to 85 wt. % vinyl acetate, 7 to 20 wt. % ethylene, 1 to 5 wt. % N-methylol acrylamide, and 2 to 10 wt. % acetoacetoxyethyl methacrylate.

* * * * *